(12) United States Patent
Kim et al.

(10) Patent No.: US 8,667,119 B2
(45) Date of Patent: Mar. 4, 2014

(54) SYSTEM AND METHOD FOR RE-GENERATING PACKET LOAD FOR LOAD TEST

(75) Inventors: Jin Ryong Kim, Daejeon (KR); Ju Young Kim, Daejeon (KR); Chang Joon Park, Daejeon (KR); Kwang Ho Yang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 970 days.

(21) Appl. No.: 12/264,589

(22) Filed: Nov. 4, 2008

(65) Prior Publication Data

US 2009/0156314 A1  Jun. 18, 2009

(30) Foreign Application Priority Data

Dec. 18, 2007  (KR) ........................ 10-2007-0133218

(51) Int. Cl.
*G06F 15/173*  (2006.01)
(52) U.S. Cl.
USPC ........................................................ 709/224
(58) Field of Classification Search
USPC ........................................................ 709/224
See application file for complete search history.

(56) References Cited

U.S. PATENT DOCUMENTS

| | | | |
|---|---|---|---|
| 6,901,051 B1* | 5/2005 | Hou et al. | 370/231 |
| 2003/0208616 A1* | 11/2003 | Laing et al. | 709/236 |
| 2005/0102318 A1* | 5/2005 | Odhner et al. | 707/102 |
| 2005/0170891 A1* | 8/2005 | Shim et al. | 463/42 |

FOREIGN PATENT DOCUMENTS

| | | |
|---|---|---|
| KR | 10-2004-0051876 | 6/2004 |
| KR | 10-2007-0060378 | 6/2007 |
| KR | 1020070060980 | 6/2007 |

OTHER PUBLICATIONS

"Use of Simulation to Test Client-Server Models", Yogesh L Deshpande et al., Proceedings of the 1996 Winter Simulation Conference.
Korean Notice of Allowance for application No. 10-2007-0133218.

* cited by examiner

*Primary Examiner* — Maceeh Anwari
(74) *Attorney, Agent, or Firm* — Lowe Hauptman & Ham, LLP

(57) ABSTRACT

A system for re-generating a packet load for a load test includes a packet collector for collecting a packet transmitted between a game client application and a game server application, a packet data storage for storing the collected packet in a list form, a central manager for editing and re-defining the stored packet as an action and constructing a test scenario by combining the re-defined packet and an agent for generating a load according to the re-defined packet and the test scenario.

10 Claims, 4 Drawing Sheets

SYSTEM AND METHOD FOR RE-GENERATING PACKET LOAD FOR LOAD TEST

CROSS-REFERENCE(S) TO RELATED APPLICATIONS

The present invention claims priority of Korean Patent Application No. 10-2007-0133218, filed on Dec. 18, 2007, which is incorporated herein by reference.

FIELD OF THE INVENTION

The present invention relates to a system and method for re-generating a packet load in a load test technique for confirming the efficiency of an on-line game server application, and more particularly to a system and method for collecting a game play packet generated while a client and a server communicate with each other and re-generating heavy load using the collected packet.

This work was supported by the IT R&D program of MIC/IITA [2006-S-044-02, Development of Multi-Core CPU&MPU-Based Cross-Platform Game Technology].

BACKGROUND OF THE INVENTION

As well known in the art, a stability test of an on-line game server application is an important part of development of a client/server based on-line game. Automatically testing the stability and performance of a multi-user server application is part of the field of software testing.

Testing stability of a server by generating load and affecting the server is a load test in terms of software engineering and is also a stress test for observing abnormalities in the server under heavy load.

Studies are underway into using a virtual client, which functions similar to an actual client, or capturing a network packet in case of a web server and using the captured packet as a load. To test stability of the server in a network environment similar to an actual environment, studies have also looked into adding a structure for configuring virtual network circuitry in a simulation environment.

A conventional technology for collecting a packet to perform a load test and regenerating heavy load using the collected packet includes a method of generating loads using an actual game client and a method based on packet replay.

However, the method of generating load using an actual game client has a disadvantage of requiring highly trained manpower in applying an actual test because a great deal of work must be implemented through programs. Moreover, since the method based on packet replay has not the concept of actions, it is difficult to test an interactive application such as a game.

An on-line game server employs complicated logic compared with a general server application. Therefore, it is difficult to test stability of an on-line game server application using a conventional packet re-use method.

SUMMARY OF THE INVENTION

Therefore, the present invention has been made in view of the above problems, and it is an object of the present invention to provide a system and method for re-generating a packet load for a load test which can easily test stability of a server application such as an on-line casual game, by collecting a game play packet generated during communication between a client and a server and by reconstructing various scenarios after re-defining and combining the collected packet as a series of actions.

In accordance with one aspect of the invention, a system for re-generating a packet load for a load test includes a packet collector for collecting a packet transmitted between a game client application and a game server application, a packet data storage for storing the collected packet in a list form, a central manager for editing and re-defining the stored packet as an action and constructing a test scenario by combining the re-defined packet and an agent for generating a load according to the re-defined packet and the test scenario. The packet collector sets up an address and a port over which the packet transmitted is to be collected and information of a protocol to be used for collection and collects the packet using a packet capture driver. The protocol is a transmission control protocol (TCP) or user datagram protocol (UDP). The central manager includes a packet editor for replacing identification, password, and session key for the stored packet with specific values, a packet register for defining the stored packet as packet groups, a scenario manager for constructing a test scenario using conditional statements and loop statements by combining the packet groups defined by the packet register, an agent manager for combining scenario, packet and load control information based on the test scenario and transmitting the combined information to the agent and a monitor for outputting real-time information of the game server application. The packet groups are processes performed in a game. The processes performed in the game include a login process and a game room creation process. The agent generates a plurality of network loads indicating a plurality of users based on the test scenario.

In accordance with another aspect of the invention, a method for re-generating a packet load for a load test includes collecting a packet transmitted between a game client application and a game server application, storing the collected packet in a packet data storage in a list form, editing and re-defining the stored packet as an action and constructing a test scenario by combining the re-defined packet and generating a load according to the re-defined packet and the test scenario. The collecting the packet collects the packet using a packet capture driver after setting up an address and a port over which the packet transmitted is to be collected and information of a protocol to be used for collection. The constructing the test scenario includes replacing identification, password, and session key for the stored packet with specific values, defining the stored packet as packet groups, constructing a scenario using a conditional statement and a loop statement by combining the defined packet groups and combining scenario, packet and load control information based on the test scenario and transmitting the combined information to an agent. The packet groups is processes performed in a game. The processes performed in the game include a login process and a game room creation process.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENTS

Figure 1:
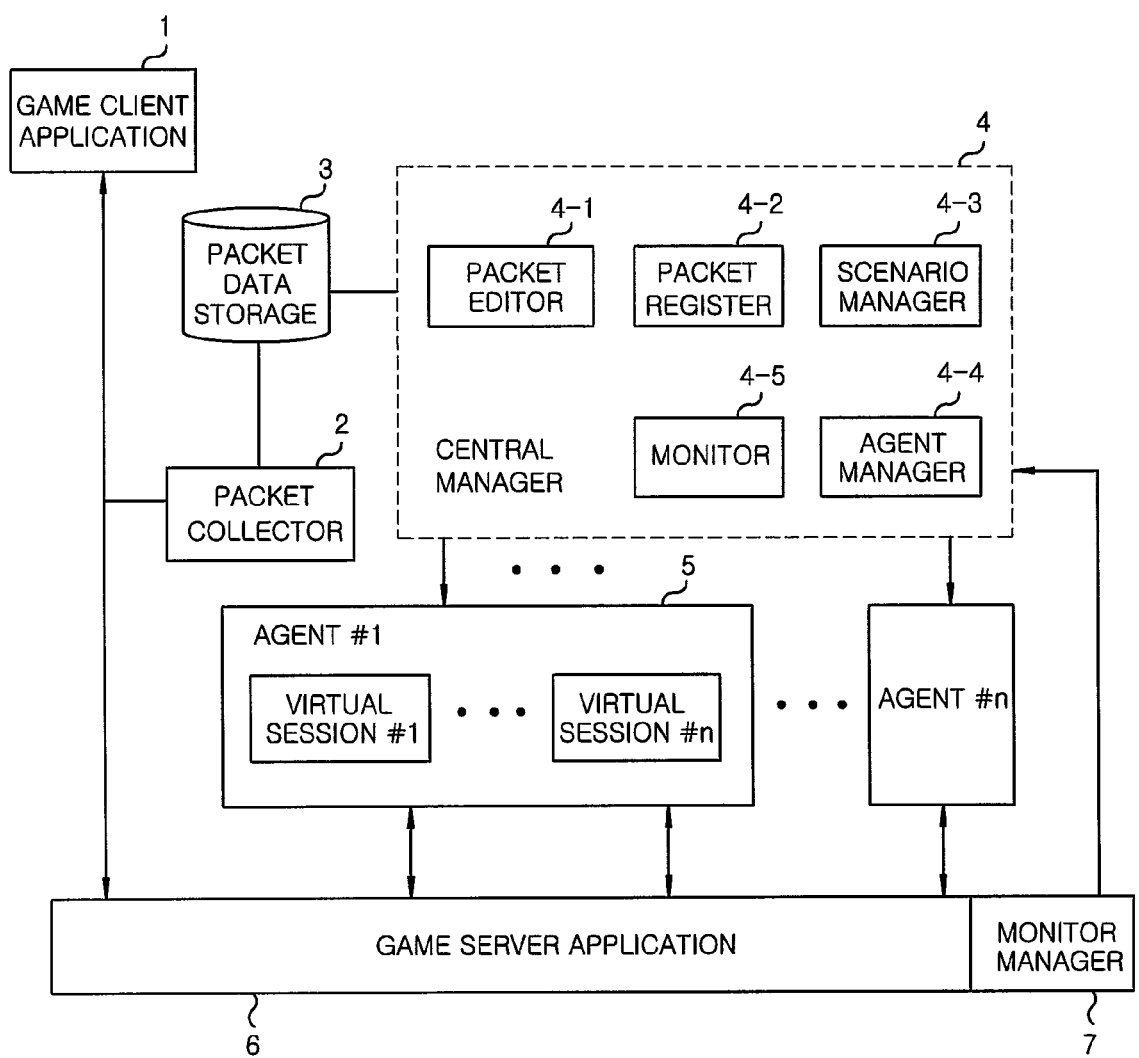
FIG. 1 is a block diagram of a packet load re-generating system for a load test according to an exemplary embodiment of the present invention.

FIG. 1 is a block diagram of a packet load re-generating system for a load test according to an exemplary embodiment of the present invention. Referring to FIG. 1, the packet load re-generating system includes a packet collector 2, a packet data storage 3, a central manger 4, and an agent 5. The packet collector 2 collects a packet generated in the course of communication between a game client application 1 and a game server application 6, for example, a transmission/reception packet for one game play. The packet data storage 3 stores the packet collected by the packet collector 2 in a list form. The central manager 4 manages the overall testing process. That is, the central manager 4 edits and re-defines the packet read from the data packet storage 3 as a series of actions and constructs a test scenario by combining the re-defined packet. The agent 5 generates heavy load according to the re-defined packet and the scenario. The packet load re-generating system includes a plurality of agents.

The packet collector 2 may be installed by a game client application, a game server application, or an additional module. The packet collector 2 sets up an address and a port over which the packet is to be collected and information of a protocol that is to be used for collection, and collects the packet using a packet capture driver. The collected packet is stored in the packet data storage 3.

A transmission control protocol (TCP) or user datagram protocol (UDP) is usually employed as the protocol but other protocols may be used. A plurality of addresses, a plurality of ports, and a plurality of protocols may be set up.

In on-line games, for example, in a casual game, a simple load test and a stress test must be easily processed and various load situations generated by an actual client must be transmitted to a server application. In this case, several samples are made and then various load situations are utilized through the packet collector 2.

The central manager 4 manages a load test and includes a packet editor 4-1, a packet register 4-2, a scenario manager 4-3, an agent manager 4-4, and a monitor 4-5.

The packet editor 4-1 edits the packet read from the packet data storage 3 to enable the packet to be re-used. That is, the packet editor 4-1 replaces an identification (ID), password, and session key necessary for game play with prescribed values to be able to play the game. Unnecessary packets are deleted by the packet editor 4-1.

Since, in some cases, sessions use different information for the ID, password, session key, etc. in on-line games, the above-described packet editor 4-1 previously edits the packet information before generating the load.

The packet register 4-2 defines and registers a series of packet groups. That is, the packet register 4-2 defines processes performed in a game, such as login and game room creation, as a series of packet groups.

The scenario manager 4-3 combines the packet groups defined by the packet register 4-2 and constructs a test scenario. The scenario may be constructed by using conditional statements, loop statements, etc. by controlling a plurality of packets registered in the packet register 4-2. In this case, the scenario is written in a script.

Since in some cases on-line games should react and replay according to the packet received from a server or a client, the packet register 4-2 defines an action by grouping the packet and the scenario manager 4-3 constructs the scenario in a script using conditional statements, loop statements, etc.

The agent manager 4-4 manages a plurality of agents, combines the scenario, packet, and load control information based upon scenario constructed by the scenario manager 4-3, and transfers the combined information to each agent.

The monitor 4-5 monitors real-time information for a physical server of the game server application 6 through a monitor manager 7 installed at the game server application 6, thereby confirming the efficiency state of the game server application 6. The monitor 4-5 receives information of the game server application 6 from the monitor manager 7 in real-time or in the form of log file.

The agent 5 generates an actual load, that is, a plurality of network loads, based on the scenario constructed in the form of script.

The plurality of network load refers to a plurality of network sessions indicating a plurality of users. Namely, since there is a plurality of agents each generating a plurality of users, numerous users are generated.

To test a stability of the game server application 6 used by a large number of users, a structure for generating a heavy load is needed. Therefore, the agent manger 4-4 manages a plurality of agents 5 and the agents 5 generate a plurality of virtual sessions to test the loads.

An operation of the packet load re-generating system configured as described above will now be described with reference to FIGS. 2 and 3.

Figure 2:
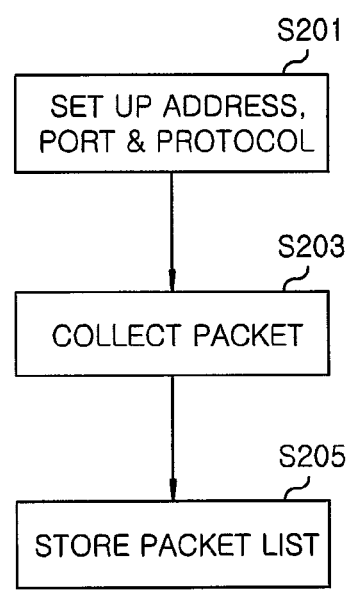
FIG. 2 is a flow chart illustrating a procedure of collecting and storing a packet according to the present invention.

FIG. 2 is a flow chart illustrating a procedure of collecting and storing packets generated in the course of communication between the game client application 1 and the game server application 6. The packet collector 2 sets up an address and a port over which the packet is to be collected and sets up information of a protocol which is to be used for collection (step S201).

In this case, the address and port utilize information of the game client application 1 and the game server application 6. The packet collector 2 may be at the same physical position as the game client application 1 or the game server application 6.

The transmission control protocol (TCP) or user datagram protocol (UDP) is usually employed as the protocol but other protocols may be used. A plurality of addresses, a plurality of ports, and a plurality of protocols may be set up.

The packet collector 2 actually collects the packet using a general packet capture driver (step S203).

Capture is divided into a full capture and an action capture. The full capture captures all the packets for one game play and generates one packet list. The action capture captures all the packets for one action within the game play. For example, if an action is defined as 'login', the action capture serves to capture a login process. One action capture generates one packet list.

The packet collector 2 stores the generated packet list in the packet data storage 3 (step S205).

The packet data storage 3 stores actual packet data, address information, protocol information, packet list information, etc.

Figure 3:
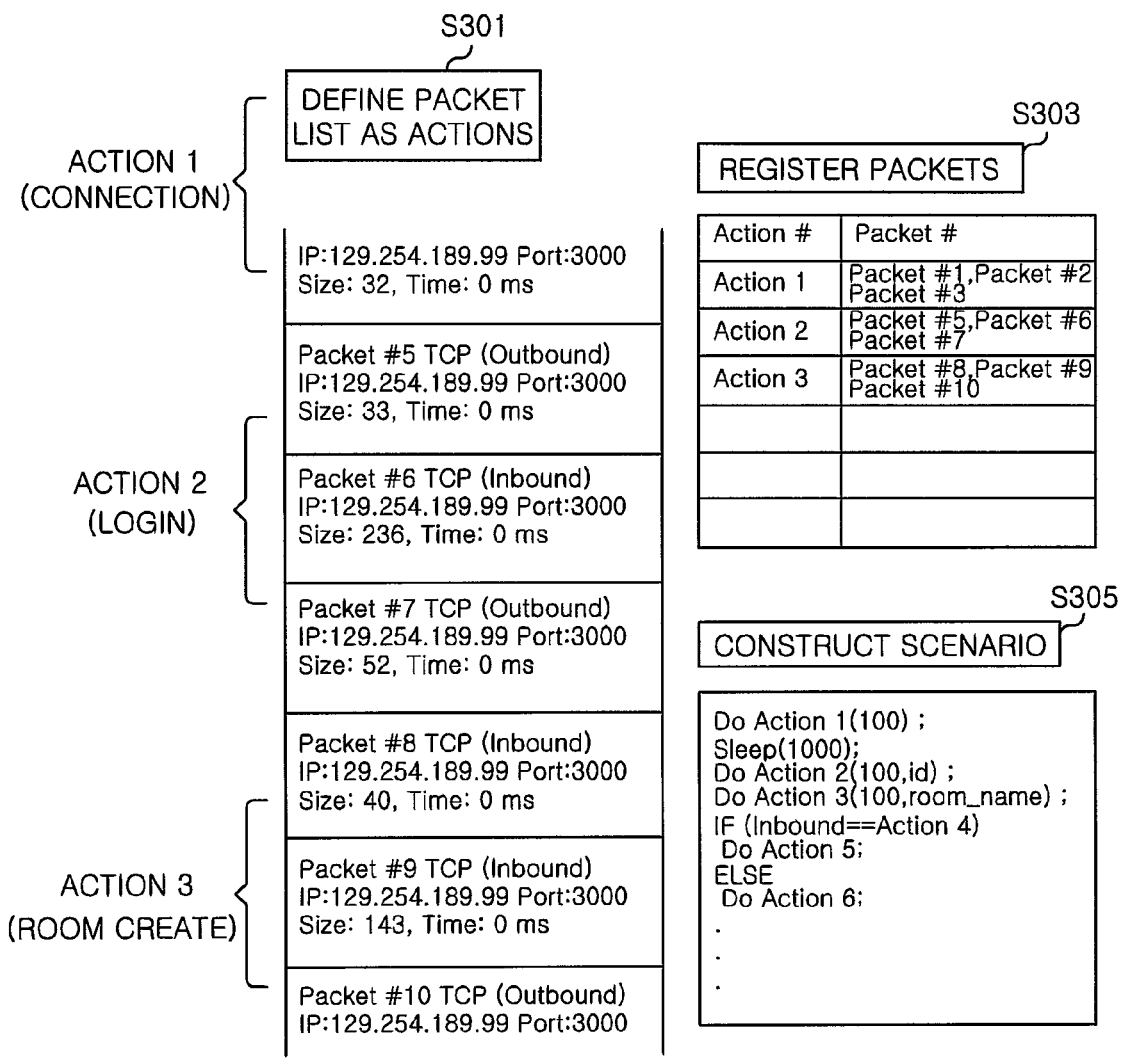
FIG. 3 is a flow chart illustrating a procedure of processing a packet list according to the present invention.

FIG. 3 is a flow chart illustrating a procedure of processing the packet list stored in the packet data storage 3 by the central manager 4.

The packet editor 4-1 of the central manager 4 defines the packet list stored in the packet data storage 3 as respective actions (step S301). The packet register 4-2 of the central manager 4 registers packets of the packet list (step S303).

In this case, one action is comprised of one or more packets and has successive index values. For example, index values from 0 to 4 may define an action for connection, index values from 5 to 7 may define an action for login, and index values from 8 to 10 may define an action for game room creation.

If the actions are defined, the scenario manager 4-3 constructs a scenario by combining the actions through a script (S305).

Since a scenario of a game test may variously branch according to inbound packets, the scenario is constructed by inserting conditional statements, loop statements, and etc.

Figure 4:
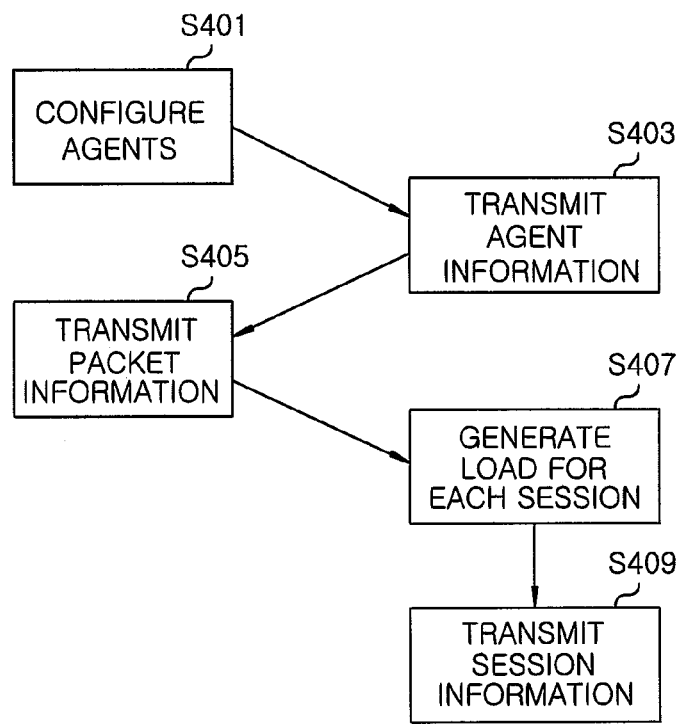
FIG. 4 is a flow chart illustrating an operation between an agent manager and an agent according to the present invention.

FIG. 4 is a flow chart illustrating an operation between the agent manager 4-4 of the central manager 4 and the agent 5.

The agent manager 4-4 configures a plurality of agents 5 (step 401). Namely, a connection is established by inputting agent connection information, for example, an IP address, and the number of virtual sessions for each agent is set up.

Next, the agent 5 transmits detailed information thereof, for example, system specification and etc. to the agent manager 4-4 (step S403).

The agent manager 4-4 combines agent information transmitted by all the agents 5 and transmits packet information to corresponding agents based on the scenario constructed by the scenario manager 4-3 (step S405). The packet information includes packet data, packet registration information, scenario information, load generation interval, and etc.

The plurality of agents generates a load based on the packet information received from the agent manager 4-4 and transmits the load to the game server application 6 (step S407).

One agent transmits the packet data by opening a plurality of virtual sessions which may be constructed by threads. Since the load is generated based on the scenario, the packet is transmitted and received with various patterns through conditional statements, loop statements and etc. if necessary.

And, the plurality of agents transmits information for each virtual session to the agent manager 4-4 in real-time or non real-time (step S409).

The information for each virtual session includes a packet index, an action index, information as to whether a packet or action is successfully transmitted and received, response time information for the action, and the like. A test on a server application such as an on-line game is performed through the confirmation of the above-described information.

Figure 5:
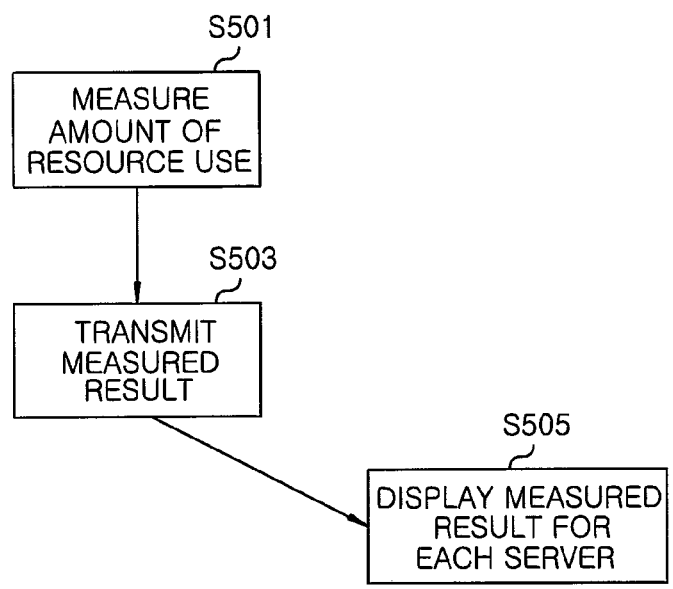
FIG. 5 is a flow chart illustrating an operation between a monitor and a monitor manager according to the present invention.

FIG. 5 is a flow chart illustrating an operation between the central manager 4, the monitor 4-5, and the monitor manager 7.

A module installed at a server device, that is, the monitor manager 7 installed at the game server application 6 measures resources used by the game server application 6 (step S501) and transmits the measured result to the monitor 4-5 in real-time or non real-time (step S503).

The monitor 4-5 displays the transmitted result for each server (step S505) to confirm the efficiency state of the game server application 6.

As apparent from the above description, the present invention can shorten a test time necessary for a simple load test such as an on-line casual game. Since information generated from a game client is processed and then used without a need for additional highly skilled work, a test application of the present invention becomes fast and test efficiency is increased.

Moreover, a system engineer as well as a developer can easily employ a stability test through a simple operation.

Since various types of simulations are previously performed, stability of a system can be ensured. Accordingly, users can obtain an opportunity to access a high-quality on-line game service.

While the invention has been shown and described with respect to the embodiments, it will be understood by those skilled in the art that various changes and modifications may be made without departing from the scope of the invention as defined in the following claims.

What is claimed is:

1. A system for re-generating a packet load for a load test, comprising:
    a packet collector for collecting packets transmitted between a game client application and a game server application;
    a packet data storage for storing the collected packets in a list form;
    a central manager for editing and re-defining the list of stored packets as a plurality of actions, each action comprising one or more of the packets in the list and constructing a test scenario by combining two or more of said plurality of actions,
    wherein the central manager includes:
    a packet editor for replacing identification, password, and session key for the stored packets with specific values;
    a packet register for defining the stored packets as packet groups;
    a scenario manager for constructing a test scenario using conditional statements and loop statements by combining the packet groups defined by the packet register;
    an agent manager for combining scenario, packet and load control information based on the test scenario and transmitting the combined information to the agent; and
    a monitor for outputting real-time information of the game server application; and
    an agent for generating a load according to the test scenario.

2. The system of claim 1, wherein the packet collector sets up an address and a port over which the packets transmitted are to be collected and information of a protocol to be used for collection and collects the packets using a packet capture driver.

3. The system of claim 2, wherein the protocol is a transmission control protocol (TCP) or user datagram protocol (UDP).

4. The system of claim 1, wherein the packet groups are processes performed in a game.

5. The system of claim 1, wherein the processes performed in the game include a login process and a game room creation process.

6. The system of claim 1, wherein the agent generates a plurality of network loads indicating a plurality of users based on the test scenario.

7. A method for re-generating a packet load for a load test, comprising:
    collecting packets transmitted between a game client application and a game server application;
    storing the collected packets in a packet data storage in a list form;
    editing and re-defining the list of stored packets as a plurality of actions, each action comprising one or more of the packets in the list and constructing a test scenario by combining two or more of said plurality of actions,
    wherein the constructing the test scenario includes:
    replacing identification, password, and session key for the stored packets with specific values;
    defining the stored packets as packet groups;

constructing a scenario using a conditional statement and a loop statement by combining the defined packet groups; and combining scenario, packet and load control information based on the test scenario and transmitting the combined information to an agent; and generating a load according to the re-defined packet and the test scenario.

8. The method of claim 7, wherein the collecting the packets collects the packets using a packet capture driver after setting up an address and a port over which the packets transmitted are to be collected and information of a protocol to be used for collection.

9. The method of claim 7, wherein the packet groups are processes performed in a game.

10. The method of claim 7, wherein the processes performed in the game include a login process and a game room creation process.

* * * * *